(12) United States Patent
Lin

(10) Patent No.: US 7,469,135 B2
(45) Date of Patent: Dec. 23, 2008

(54) ELECTRONIC APPARATUS WITH AN ANTENNA

(75) Inventor: Yung-Sen Lin, Sijhih (TW)

(73) Assignee: Acer Incorporated, Sijhih (TW)

( * ) Notice: Subject to any disclaimer, the term of this patent is extended or adjusted under 35 U.S.C. 154(b) by 0 days.

(21) Appl. No.: 11/534,524

(22) Filed: Sep. 22, 2006

(65) Prior Publication Data

US 2008/0074330 A1     Mar. 27, 2008

(51) Int. Cl.
*H04B 1/10* (2006.01)
(52) U.S. Cl. .................. 455/296; 455/296; 455/63.1
(58) Field of Classification Search ............. 375/142; 343/702; 455/296, 63.1
See application file for complete search history.

(56) References Cited

U.S. PATENT DOCUMENTS 6,738,412 B1 * 5/2004 Hayakawa ............ 375/130
7,279,989 B2 * 10/2007 Bettner et al. .......... 331/16

* cited by examiner

*Primary Examiner*—Trinh V Dinh
*Assistant Examiner*—Dieu Hien T Duong
(74) *Attorney, Agent, or Firm*—WPAT, P.C.; Anthony King

(57) ABSTRACT

An electronic apparatus with an antenna, an anti-jamming system and a method are disclosed. The electronic apparatus comprises a casing and the antenna. The antenna is composed of a patterned metal thin film and a carrier and provided for processing a wireless signal. The casing and the antenna are made by injection molding. When the electronic apparatus has a display device, the anti-jamming system can modulate a clock signal generated by the display device to prevent the multiplication of clock signal from interfering with signals within an operating band of the antenna.

12 Claims, 7 Drawing Sheets

| Set a patterned metal thin film on a carrier to form an antenna for processing a wireless signal | ~ 41 |

↓

| Place the antenna into a mold to perform an injection molding process and form the casing structure | ~ 42 |

↓

| Electrically couple the antenna to a radio frequency cable | ~ 43 |

FIG. 4

ELECTRONIC APPARATUS WITH AN ANTENNA

FIELD OF THE INVENTION

The present invention relates to an electronic apparatus with an antenna, its anti-jamming system and its method, and more particularly to an electronic apparatus that integrates an antenna with a casing to prevent the clock signal of a display module from interfering the electronic apparatus of a wireless communication module.

BACKGROUND OF THE INVENTION

As wireless transmission technologies are well developed, wireless data receiving and transmission become basic functions of many electronic apparatuses. For example, a notebook computer can support the functions of transmitting many different wireless network signals including wireless local area network (WLAN) signals, wireless Bluetooth signals and digital television signals, etc. To receive these wireless signals at different bands, it is necessary to build many antennas in the notebook computer. Referring to FIG. 1 for the design of a traditional antenna of a notebook computer 1, the notebook computer 1 installs two detachable antennas 13, 14 around a screen 12 in a casing 11, and the size of the antennas 13, 14 is restricted by the limited available space around the periphery of the screen 12.

As to the radio frequency signals with a frequency of 2.4 GHz or 5 GHz, only a small antenna is sufficient. For example, the length of a dipole antenna with a primary frequency of 5 GHz is approximately equal to 3 cm, and the antenna with a primary frequency of 2.4 GHz is approximately equal to 6 cm. For signals with a lower frequency such as the very high frequency (VHF) signal (45 MHz~300 MHz) or the ultra high frequency (UHF) signal (300 MHz~900 MHz) of a digital television, the required length of the antenna is very long. For instance, the length of a dipole antenna with a primary frequency of 150 MHz is approximately equal to 100 cm, and the length of a planar inverted F antenna (PIFA) with a primary frequency of 150 MHz is approximately equal to 70 cm. As mentioned in these situations, it is quite difficult to install such a long detectable antenna into a notebook computer 1 in accordance with the prior art, and thus the notebook computer 1 requires a connecting device such as a SMB or MMCX connector to connect an external antenna 15 for receiving or transmitting a signal of a lower frequency. However, the use of an external antenna 15 not only bends or breaks the antenna easily due to collisions, but also causes inconvenience for users to carry and use the antenna.

As wireless communication applications become popular, various different portable electronic apparatuses are equipped with a wireless communication module. If the antenna is installed near a display device, the clock multiplication of the display device will interfere with signals within the operating band of the antenna, and thus lowering the wireless communication performance. For instance, a notebook computer comes with a GSM communication module, and its operating band falls in the range from 880 MHz to 915 Hz, and its antenna is installed in a display device casing of the notebook computer, and the clock of 70 MHz is adopted by the display device of the notebook computer for updating images, then the multiplication of the clock signal by 13 times (910 MHz) will interfere signals within the GSM operating band. If the electronic apparatus is equipped with only one kind of wireless communication module, then the aforementioned interference can be avoided by using a hardware circuit design. However, there are more and more wireless communication modules installed in an electronic apparatus, and one set of notebook computer may have a GSM communication module, a WCDMA communication module and a WLAN communication module at the same time. The band used for one kind of wireless communication module is different from the other, and the chance of having an interfered band is increased drastically, and the traditional hardware circuit design is no longer sufficient for preventing interferences.

In view of the shortcomings of the prior art, the inventor of the present invention based on years of experience in the antenna field to conduct experiments and modifications, and finally developed an electronic apparatus with an antenna, its anti-jamming system and its method to overcome the foregoing shortcomings.

SUMMARY OF THE INVENTION

The primary objective of the present invention is to provide an electronic apparatus with an antenna, its anti-jamming system and its method to improve the usable space of the antenna and prevent the signals within a band of the antenna from being interfered.

An electronic apparatus with an antenna in accordance with the present invention comprises a casing and an antenna. The antenna is composed of a patterned metal thin film and a carrier and provided for processing a wireless signal. The casing and antenna are made by injection molding.

In addition, the invention provides an antenna composed of a patterned metal thin film and a carrier for processing a wireless signal. The antenna and a casing of the electronic apparatus are made by injection molding.

Further, the invention provides a method for manufacturing a casing structure with an antenna, and such casing structure is applicable for an electronic apparatus. The method comprises the steps of: setting a patterned metal thin film on a carrier to form an antenna for processing a wireless signal; and placing the antenna into a mold for an injection process to form the casing structure.

The invention also provides an anti-jamming system applicable for an electronic apparatus, and the electronic apparatus includes a first module and a second module, and the first module processes a signal at a band, and the second module performs its operation according to a clock signal. The anti-jamming system comprises a detection module and a control module, and the detection module is provided for detecting an execution mode of the first module to produce a detection result, and the control module modulates a clock signal according to the detection result to prevent the multiplication of a clock signal from interfering with signals within this band.

The invention further provides an anti-jamming method applicable for an electronic apparatus, and the electronic apparatus includes a first module and a second module, and the first module processes a signal at a band and the second module performs its operation according to a clock signal. The method comprises the step of: detecting an execution mode of the first module to produce a detection result; and modulating a clock signal according to the detection result to prevent the multiplication of a clock signal from interfering with signals within this band.

In addition, the invention further provides an electronic apparatus with an antenna, comprising a wireless communication module, a display module, a detection module and a control module. The wireless communication module processes a signal at a band through an antenna. The display module has a clock generator for displaying an image according to a clock signal generated by the clock generator. The detection module is provided for detecting an execution mode of the first module to produce a detection result. The control module modulates the clock signal according to the detection result to prevent the multiplication of the clock signal from interfering with signals within this band.

To make it easier for our examiner to understand the objective of the invention, its structure, innovative features, and performance, we use preferred embodiments together with the attached drawings for the detailed description of the invention.

BRIEF DESCRIPTION OF THE DRAWINGS

FIG. 4 is a flow chart of the method for manufacturing a casing structure with an antenna in accordance with the present invention;

DETAILED DESCRIPTION OF THE PREFERRED EMBODIMENTS

In the related figures of a preferred embodiment, the same referring numerals are used for the same components of an input apparatus in accordance with the present invention.

Figure 1:
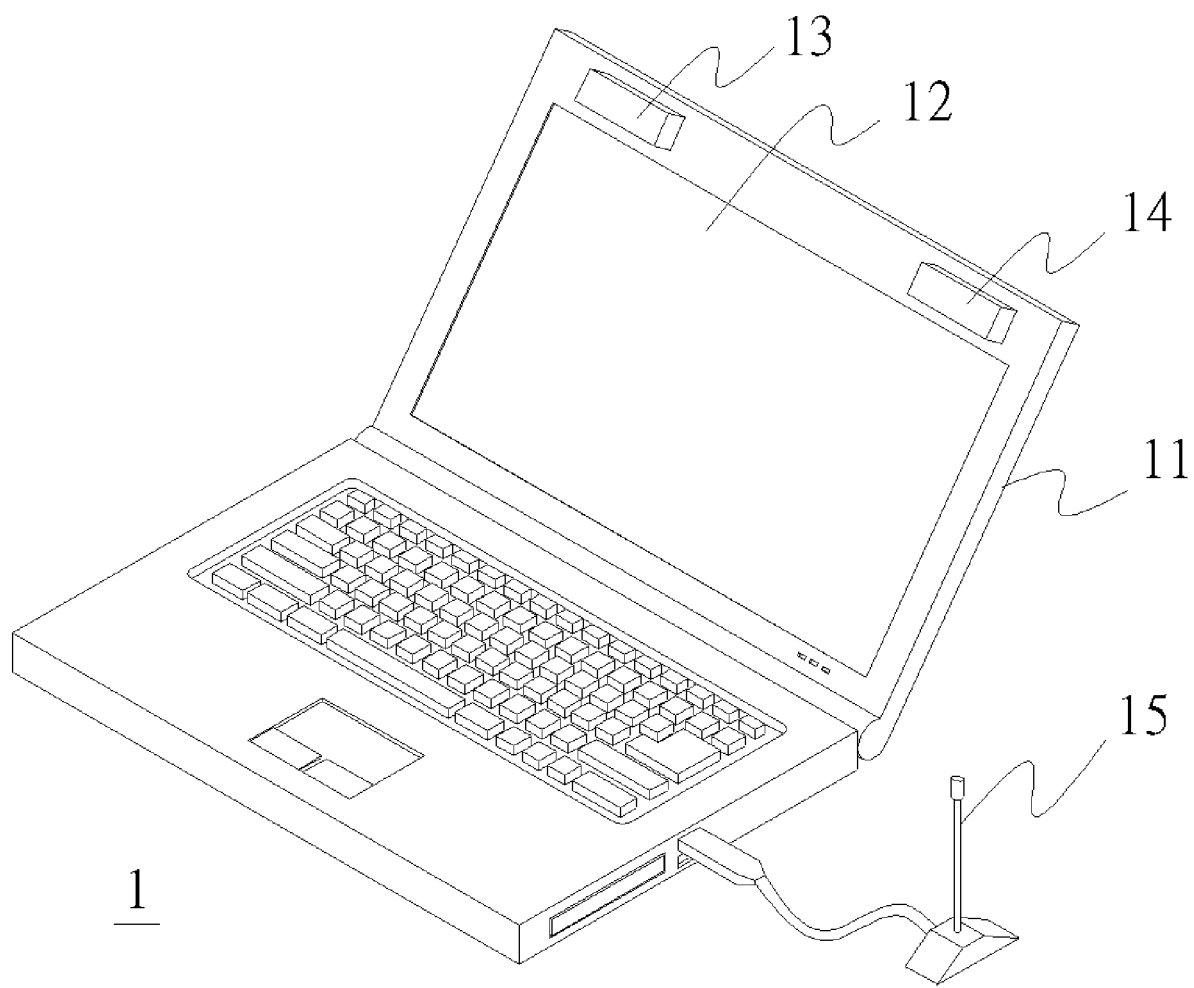
FIG. 1 is a schematic view of the design of an antenna in accordance with a prior art.
Figure 2:
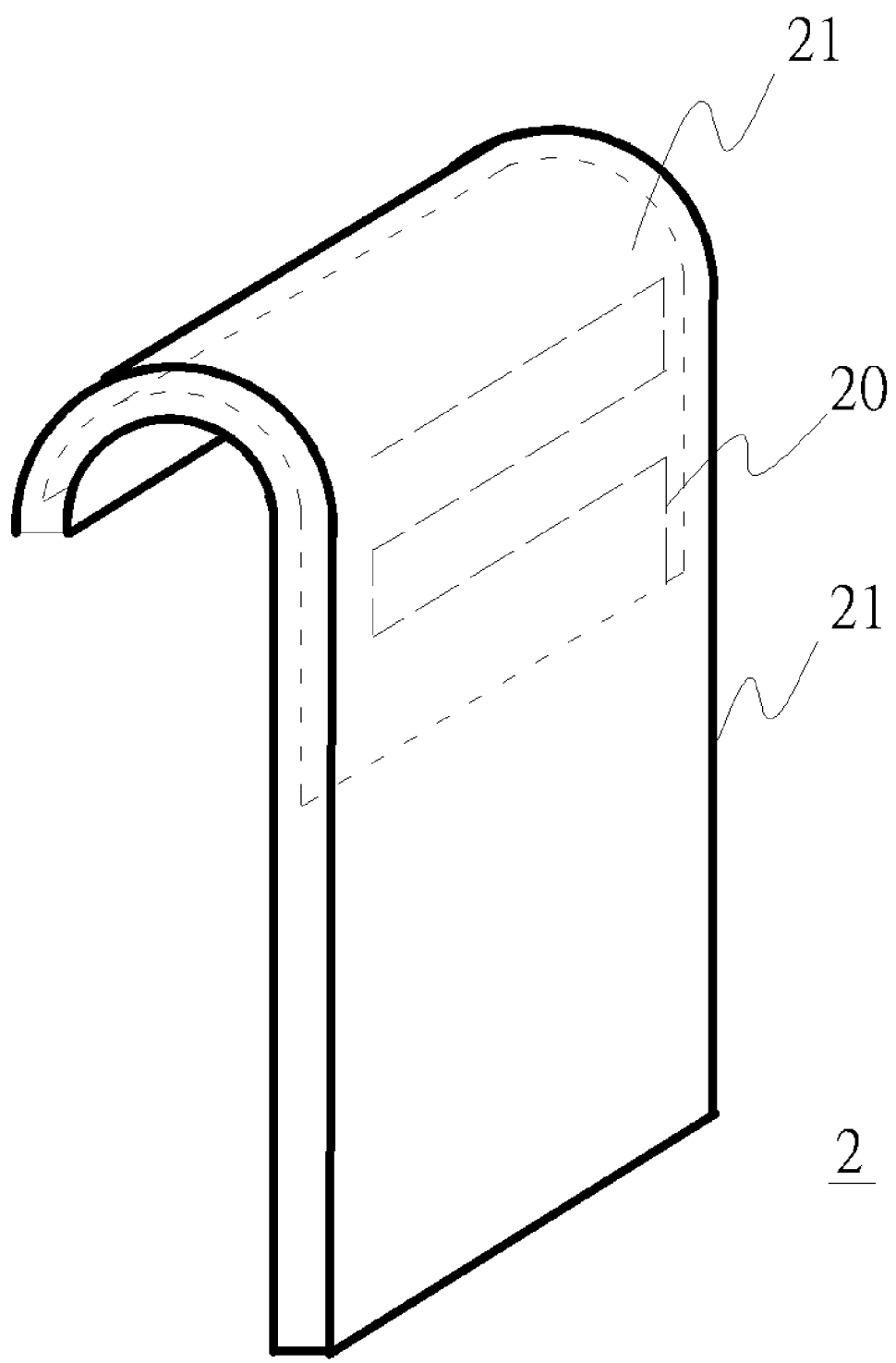
FIG. 2 is a schematic view of an antenna provided for processing a wireless signal in accordance with the present invention.

Referring to FIG. 2 for a schematic view of an antenna provided for processing a wireless signal in accordance with the present invention, the antenna 2 is composed of a patterned metal thin film 20 and a carrier 21 for processing a wireless signal, wherein the antenna 2 and a casing 22 of an electronic apparatus are made by injection molding, and the injection process is preferably an injection molding with an in-mode decoration (IMD) technology or an in-mode film decoration (IMF) technology.

The electronic apparatus is selected from a group consisting of a notebook computer, a personal digital assistant, an electronic dictionary or a wireless communication apparatus, and the carrier is selected from a group consisting of a flexible printed circuit (FPC) or a metal plated plastic film, and the antenna 11 is selected from a group of a meander-line antenna, a dipole antenna, a fractal antenna or an inverted F antenna (IFA). The patterned metal thin film is a metal conductor made of a material preferably selected from copper, gold and silver.

Figure 3:
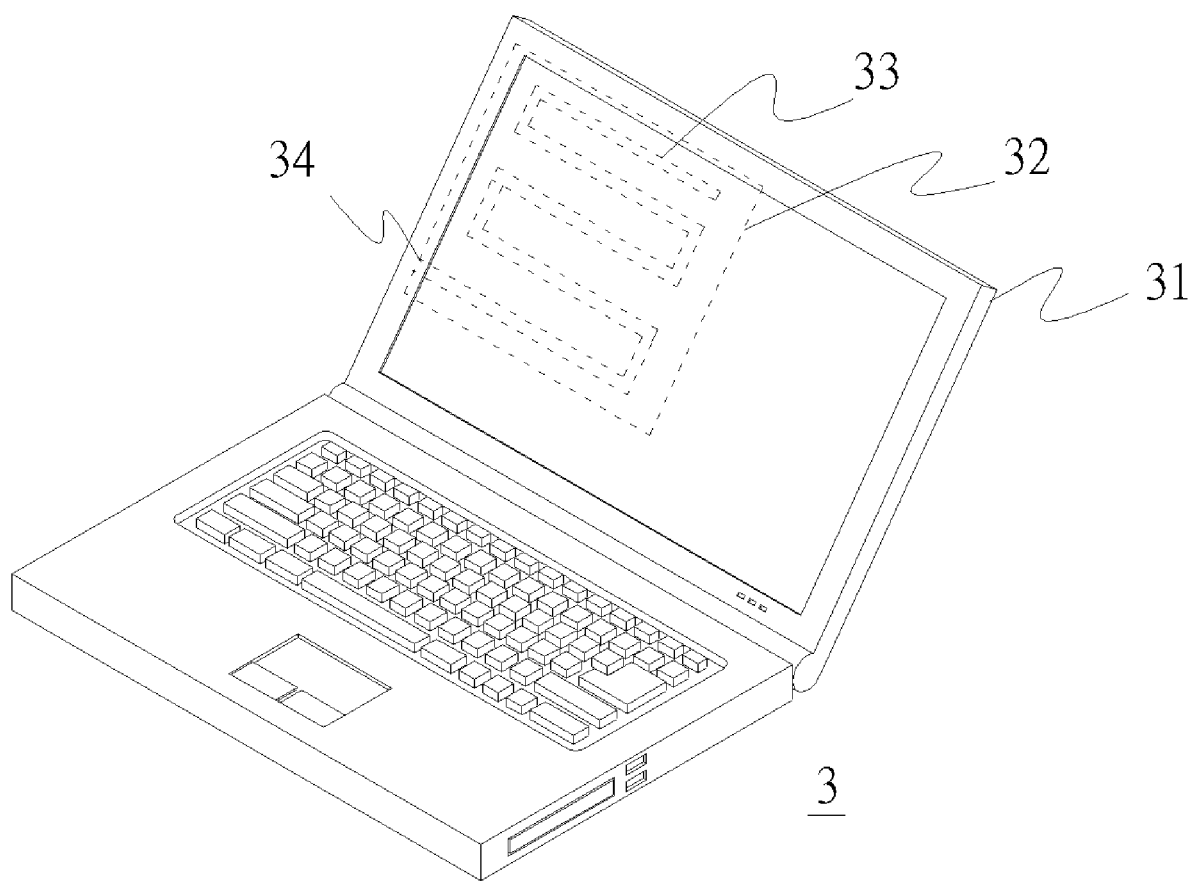
FIG. 3 is a schematic view of a preferred embodiment of an electronic apparatus with an antenna in accordance with the present invention.

Referring to FIG. 3 for a schematic view of a preferred embodiment of an electronic apparatus with an antenna in accordance with the present invention, a display device casing 31 of a notebook computer 3 has an antenna composed of a meander-line patterned copper thin film 33 and a flexible printed circuit 32, and an end 34 of the antenna is electrically coupled to a radio frequency cable for receiving a desired processing signal. The display device casing and antenna 32 are made by injection molding with an in-mode film decoration (IMF) technology, so as to achieve the effects of increasing the installable space of the antenna without increasing the volume of the notebook computer 3 and enhancing the performance of the antenna 32.

Referring to FIG. 4 for a flow chart of the method for manufacturing a casing structure with an antenna in accordance with the present invention, the casing structure is applicable for an electronic apparatus. The method comprises the steps of:

Step 41: setting a patterned metal thin film on a carrier to form an antenna for processing a wireless signal;

Step 42: placing the antenna into a mold to perform an injection molding process and form the casing structure; and Step 43: electrically coupling the antenna to a radio frequency cable.

The foregoing electronic apparatus is selected from a group consisting of a notebook computer, a personal digital assistant, an electronic dictionary or a wireless communication apparatus, and the carrier is selected from a group consisting of a flexible printed circuit (FPC) or a metal plated plastic film, and the antenna is selected from a group consisting of a meander-line antenna, a dipole antenna, a fractal antenna or an inverted F antenna (IFA). The patterned metal thin film is a metal conductor made of a material preferably selected from copper, gold and silver. The injection process is preferably performed by an injection molding with an in-mode decoration (IMD) technology or an in-mode film decoration (IMF) technology.

Although the area of the antenna is increased and the performance of the antenna is enhanced as described above, yet most antennas are installed in a display device casing, and the frequency of a display update clock of the display module becomes increasingly higher as the display technology advances, so that the signals within the operating band of the antenna will be interfered by the frequency multiplication of the display update clock and the wireless data transmission performance will be lowered.

Figure 5:
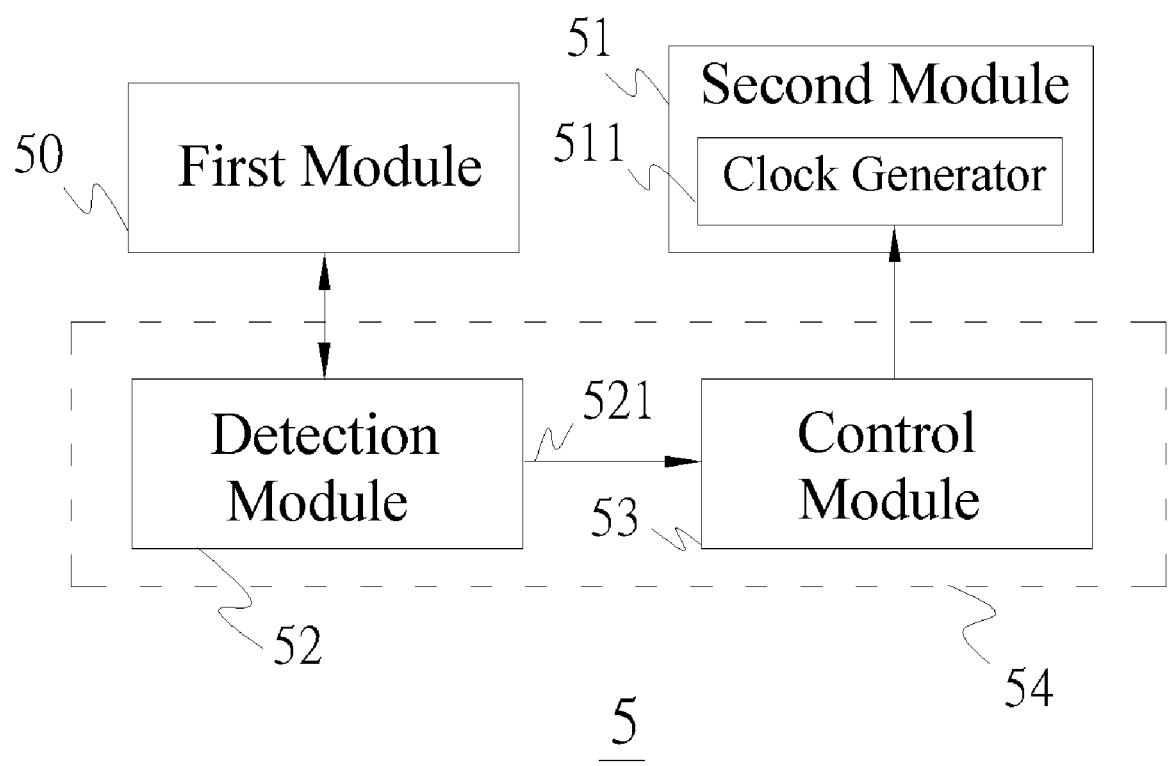
FIG. 5 is a block diagram of an anti-jamming system in accordance with the present invention.

Referring to FIG. 5 for a block diagram of an anti-jamming system in accordance with the present invention, the anti-jamming system 54 is applicable for an electronic apparatus 5, and the electronic apparatus 5 includes a first module 50 and a second module 51, and the first module 50 processes a signal at a band, and the second module 51 has a clock generator 511, and the second module 51 performs its operation according to a clock signal generated by the clock generator 511. The anti-jamming system 54 includes a detection module 52 and a control module 53, and the detection module 52 is provided for detecting an execution mode of the first module 50 to produce a detection result 521, and the control module controls the clock generator 511 according to the detection result 521, and modulates a clock signal to prevent the multiplication of a clock signal from interfering with signals within this band.

The first module 50 could be a wireless communication module, for executing a GSM mode, a WLAN mode or a WCDMA mode. The second module 52 could be a display module, and the detection module 52 is provided for detecting the intensity of signals within different bands to determine an execution mode of the first module 50, or the detection module 52 also can detect user defined parameters to determine an execution mode of the first module 50. The control module 53 preferably includes a microprocessor, a spread spectrum circuit and a memory stored with a lookup table. The lookup table records every target modulation frequency corresponding to an execution mode of the first module 50, and thus the microprocessor obtains a target modulation frequency corresponding to the detection result by looking up the lookup table according to the detection result and modulates the frequency of the clock signal to the target modulation frequency, or the microprocessor controls the spread spectrum circuit according to the target modulation frequency to modulate a frequency domain power distribution of the clock signal.

The control module 53 uses the detection module 52 to detect the interfering intensity in a band and modulates the frequency of the clock signal according to the interfering intensity, and then continues detecting the interfering intensity in the band and repeats the procedure of detecting the interfering intensity in the band and modulates the frequency of the clock signal, so as to achieve the effect of reducing the interference.

Figure 6:
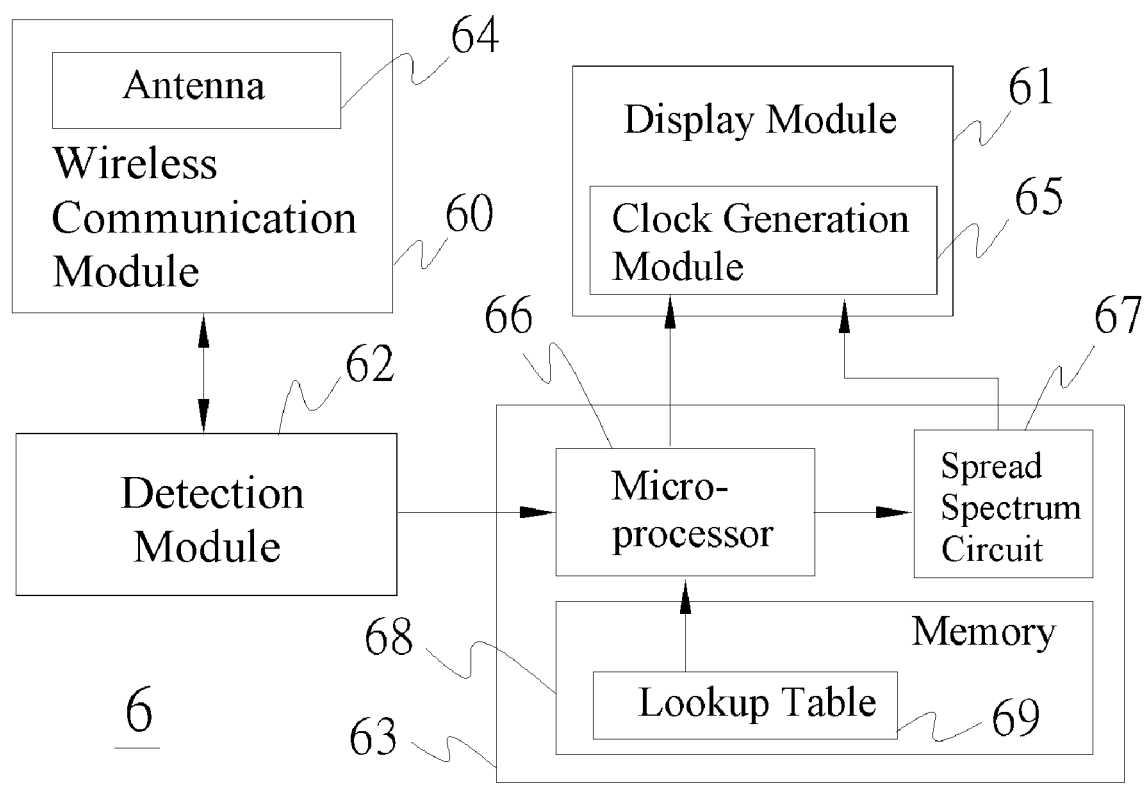
FIG. 6 is a block diagram of a preferred embodiment of an electronic apparatus with an antenna in accordance with the present invention.

Referring to FIG. 6 for the block diagram of a preferred embodiment of an electronic apparatus with an antenna in accordance with the present invention, a notebook computer 6 includes a wireless communication module 60, a display module 61, a detection module 62 and a control module 63. The wireless communication module 60 is provided for processing a signal at a band through an antenna 64. The display module 61 has a clock generation module 65, and the display module 61 updates images according to a clock signal generated by the clock generation module 65. The detection module 62 is provided for detecting an execution mode of the wireless communication module 60, such as the detection of an GSM mode, a WLAN mode or a WCDMA mode of the wireless communication module 60. The detection module 62 sends the detection result to the control module 63.

The control module 63 includes a microprocessor 66, a spread spectrum circuit 67 and a memory 69 stored with a lookup table 68. The lookup table 68 records a target modulation frequency corresponding to every execution mode of the wireless communication module 60. The microprocessor 66 reads a lookup table 68 from the memory 69 and obtains a target modulation frequency corresponding to the detection result by looking up the lookup table 68 according to the detection result, and then the microprocessor 66 controls the spread spectrum circuit 67 and the clock generation module 65 according to the target modulation frequency, and modulates the frequency of the clock signal and the frequency domain power distribution to prevent the multiplication of a clock signal from interfering with signals within this band.

If the wireless communication module 60 executes a GSM mode and the frequency of the clock signal is equal to 70 Hz, then the multiplication of the clock signal by 13 times (910 Hz) will interfere with signals within the band (880 Hz~915 Hz) of the GSM mode. Therefore, the microprocessor 66 controls the clock generation module 65 to modulate the frequency of the clock signal to 71 MHz, and the multiplication of the clock signal by 13 times will shift the frequency of the signal to 923 Hz, so as to prevent the multiplication of a clock signal from interfering with signals within the GSM band. Since the modified frequency of the clock signal is very small, the operation of the display module will not be affected.

Figure 7:
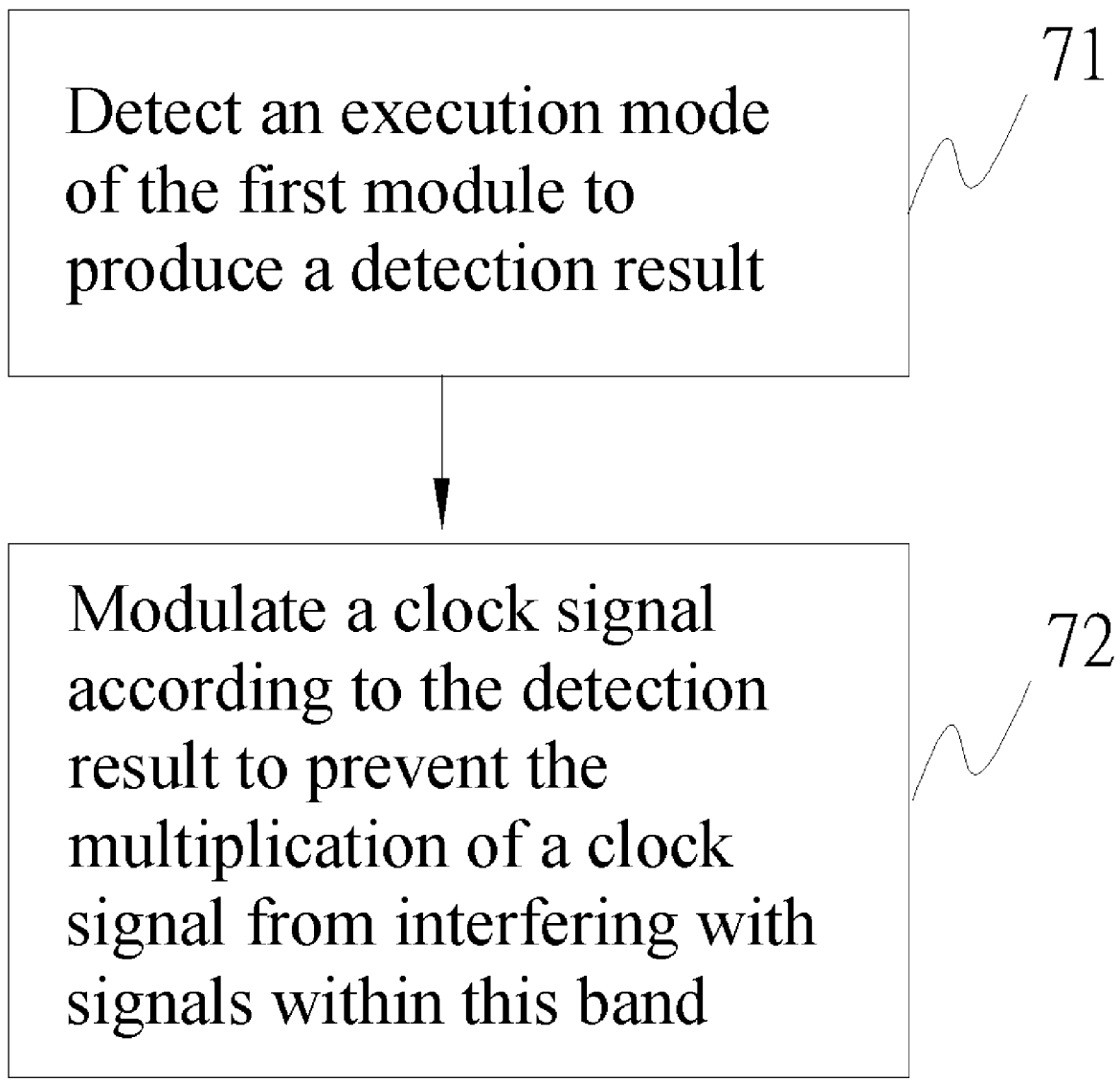
FIG. 7 is a flow chart of a preferred embodiment of an anti-jamming method in accordance with the present invention.

Referring to FIG. 7 for a flow chart of a preferred embodiment of an anti-jamming method in accordance with the present invention, the method is applicable for an electronic apparatus, and the electronic apparatus includes a first module and a second module, and the first module processes a signal at a band, and the second module performs its operation according to a clock signal. The method comprises the steps of:

Step 71: detecting an execution mode of the first module to produce a detection result; and Step 72: modulating a clock signal according to the detection result to prevent the multiplication of a clock signal from interfering with signals within this band.

The step of modulating the clock signal includes modulating the frequency of a clock signal or modulating the frequency domain power distribution of a clock signal.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An anti-jamming system, applicable for an electronic apparatus, and said electronic apparatus having a first module and a second module, and said first module processing a signal at a band, and said second module being operated according to a clock signal, and said anti-jamming system comprising:
   a detection module, for detecting an execution mode of said first module to produce a detection result; and a control module, including a lookup table and a spread spectrum circuit, and said control module obtaining a target modulation frequency by looking up said lookup table according to said detection result and then controlling said spread spectrum circuit to modulate the frequency domain power distribution of said clock signal according to said target modulation frequency for preventing the multiplication of said clock signal from interfering with signals within said band.

2. The anti-jamming system of claim 1, wherein said first module is a wireless communication module.

3. The anti-jamming system of claim 2, wherein said detection module detects said execution mode of said wireless communication module, and the execution mode is selected from a group consisting of a GSM mode, a WLAN mode or a WCDMA mode.

4. The anti-jamming system of claim 1, wherein said second module is a display module, and said display module controls an image update frequency by said clock signal.

5. The anti-jamming system of claim 1, wherein said control module further modulates the frequency of said clock signal to said target modulation frequency.

6. An anti-jamming method, applicable for an electronic apparatus, and said electronic apparatus having a first module and a second module, and said first module processing a signal at a band, and said second module being operated according to a clock signal, and said anti-jamming method comprising the steps of: detecting an execution mode of said first module to produce a detection result; obtaining a target modulation frequency corresponding by looking up a lookup table according to said detection result; modulating the frequency domain power distribution of said clock signal according to said target modulation frequency for preventing the multiplication of said clock signal from interfering with signals within said band.

7. The anti-jamming method of claim 6, wherein said first module is a wireless communication module.

8. The anti-jamming method system of claim 7, wherein said detection step comprising the sub-step of detecting said execution mode of said wireless communication module, and said execution mode is selected from a group consisting of a GSM mode, a WLAN mode or a WCDMA mode.

9. The anti-jamming method of claim 6, wherein said second module is a display module, and said display module controls an image update frequency by said clock signal.

10. The anti-jamming method of claim 6, wherein said modulation step further includes a step of modulating the frequency of said clock signal to said target modulation frequency.

11. An electronic apparatus with an antenna, comprising: a wireless communication module, for processing a signal at a band through an antenna; a display module, having a clock generator, and for displaying images according to a clock signal generated by said clock generator; a detection module, for detecting an execution mode of said wireless communication module to produce a detection result; and a control module, including a lookup table and a spread spectrum circuit, and said control module obtaining a target modulation frequency by looking up said lookup table according to said detection result and then controlling said spread spectrum circuit to modulate the frequency domain power distribution of said clock signal according to said target modulation frequency to prevent the multiplication of said clock signal from interfering with signals within said band.

12. The electronic apparatus of claim 11, wherein said control module further modulates the frequency of said clock signal to said target modulation frequency.

* * * * *